United States Patent [19]

Urban et al.

[11] 4,361,644
[45] Nov. 30, 1982

[54] METHOD FOR RECORDING FLOW BOUNDARY LAYERS IN LIQUID MEDIA

[75] Inventors: Gerd Urban; Heinrich Opitz, both of Erlangen; Gert Mages, Hemhofen, all of Fed. Rep. of Germany

[73] Assignee: Siemens Aktiengesellschaft, Munich, Fed. Rep. of Germany

[21] Appl. No.: 236,234

[22] Filed: Feb. 20, 1981

[30] Foreign Application Priority Data

Mar. 4, 1980 [DE] Fed. Rep. of Germany ....... 3008260

[51] Int. Cl.$^3$ ...................... G01D 9/42; G01D 21/00; G01N 33/00
[52] U.S. Cl. ................................ 430/422; 23/230 R; 23/230 A; 430/423; 346/1.1; 346/107 R
[58] Field of Search ...................... 23/230 R, 230 A; 73/147, 432; 346/1.1, 107 R; 430/422, 423

[56] References Cited

U.S. PATENT DOCUMENTS

| 2,458,877 | 1/1949 | Rose | 346/107 R |
| 3,753,652 | 8/1973 | Gassmann | 23/230 A |
| 3,774,225 | 11/1975 | Kimmel et al. | 346/1 |
| 3,787,874 | 1/1974 | Urban | 346/107 R |
| 3,835,703 | 4/1974 | Bush | 346/1.1 |
| 3,890,835 | 6/1975 | Dötzer et al. | 346/1.1 |
| 4,250,249 | 2/1981 | Montag | 73/147 X |

OTHER PUBLICATIONS

Main-Smith, A.R.C. Technical Rep. R & M No. 2755, (1950), Chemical Solids as Diffusible Coating Films for Visual Indications of Boundary-layer Transition in Air and Water.

Primary Examiner—Michael S. Marcus
Attorney, Agent, or Firm—Kenyon & Kenyon

[57] ABSTRACT

The disclosed method relates to a method for recording flow boundary layers in liquid media by photochemical means. According to the invention, surfaces which can be developed in a plane and to which a photographic film sheet is cemented are exposed under steady-state conditions to the flow of a liquid medium containing a dissolved agent reacting with the photo gelatin layer. The liquid medium may contain agents furnishing HS-ions or agents capable of dissolving silver halide or reducing silver halide. If a photographic film sheet is used, the silver ions of which are reduced to silver, the flow exposure is performed with an agent having oxidizing and dissolving action. With the method disclosed, half-tone photograms of flow boundary layers in liquids can be recorded.

8 Claims, No Drawings

METHOD FOR RECORDING FLOW BOUNDARY LAYERS IN LIQUID MEDIA

BACKGROUND OF THE INVENTION

The present invention relates to a method for recording flow boundary layers in liquid media by photochemical means.

For recording flow patterns in a liquid flow medium, the use of an emulsified brushing medium of linseed oil varnish, Turkish-red oil and lamp black on a white background, with spotted dot or line application is known. However, substantial transfer or matter is not involved in this method. Rather, the method involves a mechanically effective indication of flow direction and intensity. With diffusing solids under water, it is possible to make boundary layer transition lines visible (J. D. Main-Smith, A.R.C. Technical Report R. & M. No. 2755, Feb. 1950, pp. 1–16). The velocities at the model corresponded to up to $10\frac{1}{2}$ knots = 5.4 m/s for a ship 125 m long. S. K. Stynes & J. E. Myers worked with a solution of benzoic acid in water (A.I. Ch. E. Journel, vol. 10 (1964), No. 4, pgs. 437 to 444).

It is further known to utilize for the pictorial recording of liquid flows along solid surfaces, the precipitation of difficult-to-dissolve substances within a gelatinous layer in the flow liquid (U.S. Pat. No. 3,753,652). As suitable substances can be considered azo dyes, and ferri or ferro cyanides of copper or iron.

A method relating to the use of gaseous fluid (usually air) for making steady-state flow states visible by photochemical means utilizes ready-made photo gelatin containing silver bromide for displaying the boundary layer (U.S. Pat. No. 3,774,225). The method operates with photochemically reactive gases, especially with hydrogen sulfide, admixed to the air. The hydrogen sulfide diffuses into a swelled photo gelatin and produces a silver sufide image which is subsequently made visible by fixing.

SUMMARY OF THE INVENTION

It is an object of the present invention to record flow boundary layers in liquid media, preferably in water, according to their local relative thickness.

This and other objects are achieved by a process comprising exposing a surface which can be developed in a plane and to which a photograhic film sheet is cemented, under steady-state conditions, to a liquid medium containing a dissolved agent reacting with the photo gelatin layer. If the surface provided with the cemented-on film is exposed to the flow of the liquid medium under steady-state conditions, an agent dissolved in the liquid medium diffuses under the control of the local boundary layer thickness into the photo gelatin layer of the film sheet and reacts with the silver halide dispersed therein. Depending on the agent used, either insoluble silver sulfide or silver is produced; the formation of silver sulfide may initially not be visible due to superimposed silver bromide. The unreacted residue of the silver halide is removed by fixing.

To carry out the method according to the present invention, the flow exposure in a liquid medium, particularly an aqueous fluid, can be made in the presence of a dissolved agent providing HS-ions. Suitable agents are, for example, sodium sulfide, thiourea and thio-semicarbazide. Especially well suited has been found to be thioacetamide.

The exposure conditions such as duration, temperature, agent concentration and pH-value must be matched so that pictorial displays of the boundary layer thickness distribution are produced. The diffusion of the agent into the layer proceeds through thin flow boundary layers several times faster than in the rest position, and, hence, static tests only furnish a practical guide post. The degree of blackening of sulfur-containing agents was investigated in some test series with a stationary foil. The blackening or browning increases with the exposure time, the temperature, the agent concentration and the pH-value. This was shown by tests with a thioacetamide solution. With approximately the same sulfur molarity of 1 to $2 \times 10^{-3}$, sodium sulfide (and in particular thioacetamide) yield good flow patterns. Thiourea and thio-semicarbazide have similar effects. With sodium sulfide, the picture contrast seems weaker than with thioacetamide. With a higher pH-value, thioacetamide, for example, precipitates the silver sulfide more intensively. This was shown by tests with an addition of sodium hydroxide to a pH of 11, as compared with a neutral thioacetamide solution.

According to one advantageous embodiment of the present invention, a silver halide-dissolving agent can be added to the liquid medium and the remainder of the silver halide present in the photo gelatin layer after the flow exposure can be converted into silver. The image becomes visible still better and more permanently if it is reduced to the silver image with photo developer. In this "silver halide-silver process", colloidially distributed, difficult-to-dissolve silver halide (preferably silver bromide) is converted into the soluble thio-sulfate complex. The flow boundary layer thus is imaged first by partial dissolution of silver halide which makes the film opaque. For an exposure time of about 3 minutes, a fixing bath ready for use for photographic copies is further diluted 5 times. Longer exposures require still further dilution in order to obtain good boundary layer pictures with densities of 0.5 to 1 D. Subsequently, the halide image is reduced to the silver image.

Other suitable complex-forming agents, are, for example, alkali cyanide, -thiocyanate and ammonia. These reagents are distinguished not only by longer useful life, but the effective strength of the solutions also remains unchanged for long periods of time. With this procedure (working without sulfur), the diffused exposure required for the formation of silver seeds is obtained automatically if one works in daylight.

For implementing the method according to the present invention, a photographic film sheet, the silver salt of which is reduced to silver, also can be used. In this case, the surfaces to which the film is cemented can be exposed to an agent with oxidizing and dissolving action. According to this "silver process", the photo gelatin can be treated for this purpose with an organic reducing agent, whereby a primary silver image is produced which is superimposed by silver halide and is not visible, and which is changed subsequently into the durable silver image by an agent dissolving silver halide. According to a further particularly advantageous embodiment of the silver process, the silver salt content of the photo gelatin layer is first reduced entirely to silver. For generating a picture, flow exposure is made to agents which oxidize and dissolve the silver (photographic attenuation). This produces a transparent permanent silver image immediately.

Agents with suitable oxidizing and dissolving action of the image-generating flow exposure are known attenuators such as potassium hexacyanoferrate (III) mixed with thiosulfate and acid permanganate.

According to the embodiments of the present invention, a transparent black-and-white half-tone density distribution is produced, the local blackening of which represents a measure for the local boundary layer thickness prevailing during the flow exposure.

By means of the method according to the invention, half-tone photograms of boundary layers over solid surfaces can be obtained in fluid-flow machinery such as pumps or coolers for liquid media, especially water.

DETAILED DESCRIPTION OF THE INVENTION

In the following, the method of the present invention is described in further detail through the example of impact cooling of an X-ray tube.

For this purpose, the photo gelatin sheet film was cemented to the impact surface model and exposed to the flow, using a thioacetamide-containing solution. The thioacetamide stock solution used was prepared by dissolving 16 grams thereof per liter of water (0.21 molar). The sodium hydroxide for alkalizing contained 80 grams of sodium hydroxide per liter (2.0 molar).

For use, the solution was prepared by diluting 250 ml thioacetamide stock solution and 180 ml stock liquor to 30:1. The impact surface model was exposed to the flow, depending on the permeability of the nozzles, with the full or a partial amount (down to 10:1) under hydrostatic or slight overpressure in such a manner that exposure times of typically 1 to 3 minutes were obtained. At the nozzle apertures, the velocity was about 1 to 3 m/s.

Also with the silver halide-silver process, commercial fixing bath concentrate was used as the stock solution. For use, a solution was prepared by diluting 353 ml "Superfix" (Tetenal) to 30:1. The procedure was otherwise the same as described above.

What is claimed is:

1. A method for recording flow boundary layers in liquid media by photographic means, comprising:
    (a) providing a solid planar surface;
    (b) affixing to said surface a photographic sheet film containing silver halide in a gelatin layer; and
    (c) exposing said surface, having said sheet film thereon, to a flowing liquid medium having dissolved therein an agent capable of diffusing into the gelatin layer of said photographic sheet and reacting with the silver halide therein to provide an image of the boundary layers of flow over said solid surface.

2. The method according to claim 1 wherein said agent dissolved in said liquid medium reacts with said silver halide to form an insoluble silver compound, and wherein said photographic sheet film is treated, after said flow has ceased, to remove remaining silver halide therefrom.

3. The method according to claim 2 wherein said agent dissolved in said liquid medium is an agent capable of providing HS-ions.

4. The method according to claim 3 wherein said agent is thioacetamide.

5. A method for recording flow boundary layers in liquid media by photographic means, comprising:
    (a) providing a solid planar surface;
    (b) affixing to said surface a photographic sheet film containing silver halide in a gelatin layer;
    (c) exposing said surface, having said sheet film thereon, to a flowing liquid medium having dissolved therein an agent capable of diffusing into the gelatin layer of said photographic sheet and dissolving silver halide therefrom; and
    (d) thereafter converting the silver halide remaining in said photographic sheet film, after said flow has ceased, to elemental silver to provide in said film sheet an image of the boundary layers of flow over said surface.

6. The method according to claim 5 wherein said agent dissolved in said liquid medium is thiosulfate.

7. A method for recording flow boundary layers in liquid media by photographic means, comprising:
    (a) providing a solid planar surface;
    (b) affixing to said surface a photographic sheet film containing silver halide in a gelatin layer;
    (c) converting the silver halide in said sheet film to elemental silver; and
    (d) exposing said surface, having said sheet film thereon, to a flowing liquid medium having dissolved therein an agent capable of diffusing into the gelatin layer of said sheet film and oxidizing and dissolving silver contained therein such that silver remaining in said sheet film, after said flow has ceased, provides an image of the boundary layers of flow over said surface.

8. A method for recording flow boundary layers in liquid media by photographic means, comprising:
    (a) providing a solid planar surface;
    (b) affixing to said surface a photographic sheet film containing silver halide in a gelatin layer; and
    (c) exposing said surface, having said sheet film thereon, to a flowing liquid medium having dissolved therein agents capable of reducing silver halide in said film to silver and dissolving from said film any remaining silver halide.

* * * * *